July 22, 1947.  C. M. ZUBLER  2,424,530
THROW OUT BEARING
Filed April 2, 1946

Camp M. Zubler
INVENTOR
BY Louis Necho
ATTORNEY

Patented July 22, 1947

2,424,530

UNITED STATES PATENT OFFICE 2,424,530

THROWOUT BEARING

Camp M. Zubler, Drexel Hill, Pa.

Application April 2, 1946, Serial No. 658,996

4 Claims. (Cl. 308—233)

My invention relates to a throw out bearing of the type used to disengage the clutch of a motor vehicle.

An object of the invention is to produce an improved throw out bearing of this type.

In certain types of pre-war automobiles, the clutch throw out bearing included a metal housing adapted to be engaged by a yoke at the end of the clutch pedal lever, and a carbon ring non-rotatably carried by said metal housing and adapted to engage the rotating clutch release lever. In this type of construction, the carbon ring wore out relatively rapidly and the metal housing came into contact with the clutch release lever before the motorist was aware of the condition and before repairs could be made. This resulted in damage to the parts and relatively frequent replacement of the carbon ring with consequent expense and inconvenience.

It is therefore a still further object of my invention to produce an improved throw out bearing which includes a ball bearing sub assembly, the operative face of which is rotary and projects beyond the plane of the bearing housing so as to contact and actuate the clutch release lever with minimum friction.

These and other objects are attained by my invention as set forth in the following specification and as illustrated in the accompanying drawings in which.

Figure 1:
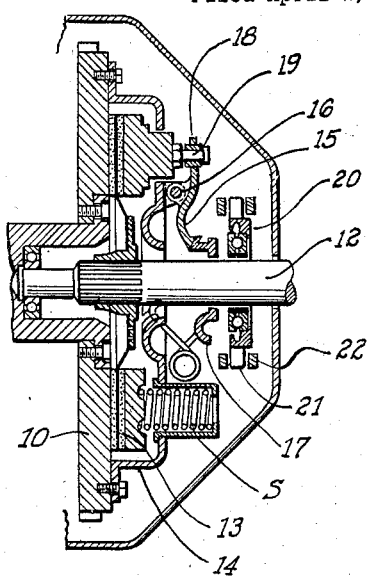
Fig. 1 is a vertical sectional view showing as much of a conventional clutch assembly as is necessary to illustrate on application of my invention.

In Fig. 1 there is shown a fly wheel 10 adapted to be rotated by power transmitted from an engine not shown. A drive shaft 12 is connected to the rear wheels of the vehicle and is adapted to be driven by means of a clutch 13 splined on the drive shaft and adapted to engage the fly wheel. The clutch plate 13 is pressed against the fly wheel by springs S carried by a housing 14, which is secured to the fly wheel and is free to rotate independently of the shaft 12.

A release lever 15 is pivoted to the housing at 16 and is so arranged that, when the end 17 thereof is moved toward the fly wheel, the end 18 thereof, which is secured to the clutch at 19, moves the clutch plate 13 away from the fly wheel.

The throw out bearing embodying my invention is carried by a housing 20 having lugs 21 for engagement with a yoke 22 at the end of the clutch pedal lever. The housing 20 is freely slidable longitudinally of the shaft 12 and is so connected to the clutch pedal that, when the clutch pedal is depressed, the bearing housing 20 is moved to the left, as viewed in Figs. 1 and 3, so as to actuate the release lever 15 in clutch disengaging direction.

Figure 2:
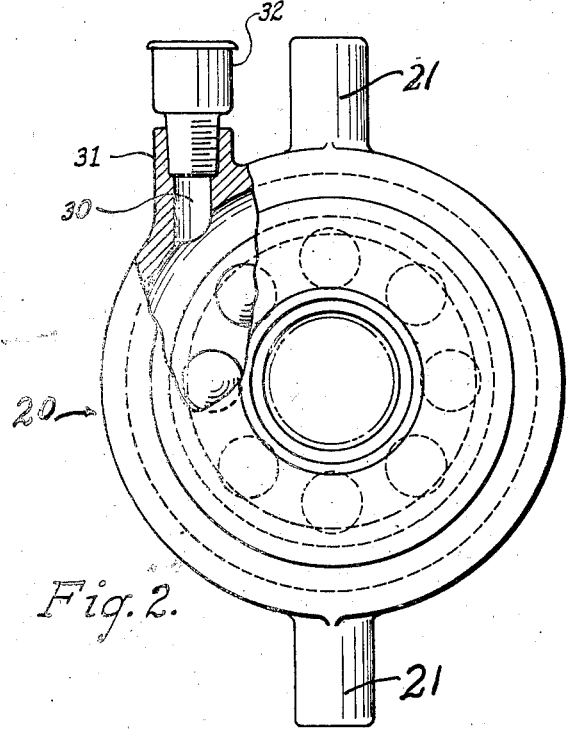
Fig. 2 is a greatly enlarged view, partly in section and partly in elevation, of a throw out bearing embodying the invention.
Figure 3:
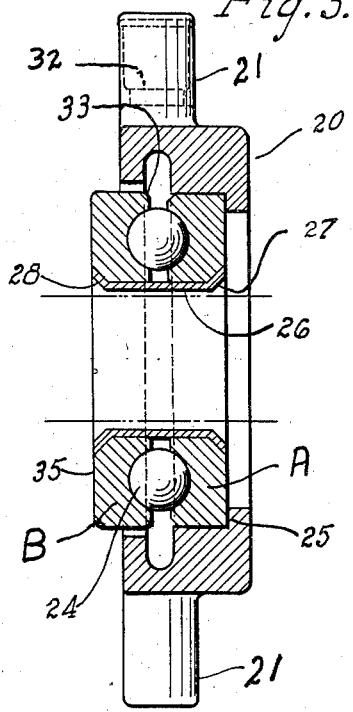
Fig. 3 is a view, partly in section and partly in end elevation, of the bearing shown in Fig. 2.

As shown in Figs. 2 and 3, my improved throw out bearing embodying my invention includes an inner ball race, A, an outer ball race, B, and ball bearings 24 located therebetween. The inner ball race A is press-fitted into a seat provided in the housing body and abuts a limiting or positioning shoulder 25. The outer, rotatable ball race B is secured to the inner ball race by means of an annulus 26 which extends through the bore formed in the center of the ball races, and the opposite ends of which are rolled to form flanges 27 and 28 engaging the beveled adjacent edges of the ball races. It will be seen that by this arrangement I am enabled to drill a passage 30 in a boss 31 provided for the purpose, for receiving an oil or grease fitting 32 through which the bearing may be lubricated. This is important for satisfactory operation and convenience of servicing as distinguished from a similar bearing in which the clamping annulus 26 is interposed between the ball races and the housing, so as to engage the outer peripheries of the ball races. When the clamping annulus is on the outer surface or circumference of the ball races, the bearing must be packed with grease before it is assembled, and can not, from the practical stand point, be repacked.

In order to facilitate lubrication, the inner edge of the ball race B is beveled as at 33, or at the inner end of the passage 30.

When a bearing such as that shown is used for actuating the clutch release lever 15, the face 35 of the ball race B, which projects beyond the plane of the housing 20, comes in contact with the revolving release lever. Since the ball race B is free to rotate, it engages the release lever end 17 with minimum friction, so that there is no appreciable wear or need of replacement as is the case where a carbon ring is fixedly press fitted into the housing and takes the place of the ball race B.

Having described my invention, what I claim as new and desire to secure by Letters Patent, is:

1. A throw out bearing comprising a housing having a bore therethrough, said housing also having a counterbored seat formed in the body thereof and communicating with said bore, an annular, fixed ball race mounted in said seat, an annular, rotatable ball race, ball bearings between said ball races, and an annulus extending through the bore of said ball races, the opposite ends of said annulus being deflected to form flanges engaging adjacent edges of said ball races.

2. The structure recited in claim 1 in which said rotating ball race projects beyond the plane of said housing.

3. A throw out bearing comprising a housing having a bore therethrough, said housing also having a counterbored seat formed therein, a fixed ball race press fitted into said seat, said ball race having a bore formed therethrough, a rotatable ball race, ball bearings between said ball races, an annulus extending through said bore and having its opposite ends deflected to form flanges engaging adjacent portions of said ball races, the inner circumferential edge of one of said ball races being beveled, there being a passage formed through the body of said housing and a lubricating fitting mounted in the body of said housing and leading to said passage.

4. The structure recited in claim 3 in which the operative face of the rotating ball race projects beyond the plane of said housing.

CAMP M. ZUBLER.